(12) United States Patent
Tashiro

(10) Patent No.: US 8,411,156 B2
(45) Date of Patent: Apr. 2, 2013

(54) SIGNAL PROCESSING APPARATUS AND METHOD FOR SUPPRESSING A DELAY IN IMAGING DATA

(75) Inventor: Kei Tashiro, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 288 days.

(21) Appl. No.: 12/951,984

(22) Filed: Nov. 22, 2010

(65) Prior Publication Data

US 2011/0157437 A1 Jun. 30, 2011

(30) Foreign Application Priority Data

Dec. 25, 2009 (JP) ................................ 2009-296320

(51) Int. Cl.
| | |
|---|---|
| H04N 5/232 | (2006.01) |
| H04N 7/00 | (2011.01) |
| H04N 11/00 | (2006.01) |
| H04N 5/04 | (2006.01) |
| H04N 9/44 | (2006.01) |
| H04N 9/47 | (2006.01) |

(52) U.S. Cl. ................ 348/211.1; 348/211.14; 348/464; 348/500; 348/503

(58) Field of Classification Search .................. None
See application file for complete search history.

(56) References Cited

U.S. PATENT DOCUMENTS

| | | | | |
|---|---|---|---|---|
| 5,191,437 A | * | 3/1993 | Kim | ............................... 386/264 |
| 6,449,007 B1 | * | 9/2002 | Yokoyama | ....................... 348/73 |
| 6,539,109 B1 | | 3/2003 | Hirose | |
| 6,917,762 B2 | * | 7/2005 | Kim | ............................... 398/158 |
| 7,209,178 B1 | * | 4/2007 | Lee et al. | ....................... 348/513 |
| 7,889,239 B2 | * | 2/2011 | Nakajima | ................. 348/211.14 |
| 2009/0244303 A1 | | 10/2009 | Kinoshita et al. | |

FOREIGN PATENT DOCUMENTS

| | | |
|---|---|---|
| JP | 63-086630 | 4/1988 |
| JP | 09-135379 | 5/1997 |
| JP | 10-112706 | 4/1998 |
| JP | 2000-152280 | 5/2000 |
| JP | 2000-224464 | 8/2000 |
| JP | 2005-244709 | 9/2005 |
| JP | 2005-311535 | 11/2005 |
| JP | 2006-023829 | 1/2006 |
| JP | 2008-283331 | 11/2008 |
| JP | 2009-267969 | 11/2009 |

OTHER PUBLICATIONS

Japanese Patent Application No. 2009-296320; Notice of Reasons for Rejection; Mailed Feb. 15, 2011 (with English translation).
Japanese Patent Application No. 2009-296320; Notice of Reasons for Rejection; Mailed Feb. 7, 2012 (with English translation).

* cited by examiner

Primary Examiner — Justin P Misleh
(74) Attorney, Agent, or Firm — Blakely, Sokoloff, Taylor & Zafman LLP

(57) ABSTRACT

According to one embodiment, an imaging apparatus including an imaging module that outputs imaging data for each color component including a synchronization code, a synchronization detecting module that detects a synchronization code from imaging data output from the imaging module, a data holding module that temporarily holds video data for each color component output from the imaging module, and a synchronization module that aligns the phases of video data for each color component held by the data holding module.

11 Claims, 4 Drawing Sheets

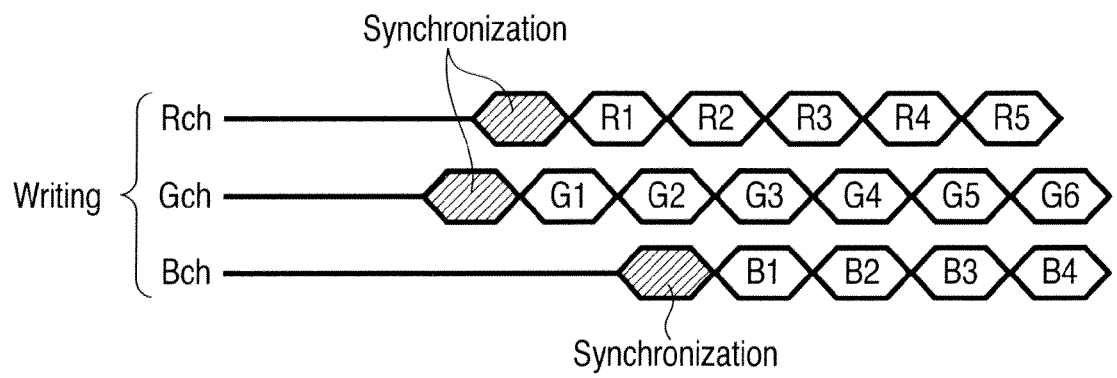
F I G. 3A
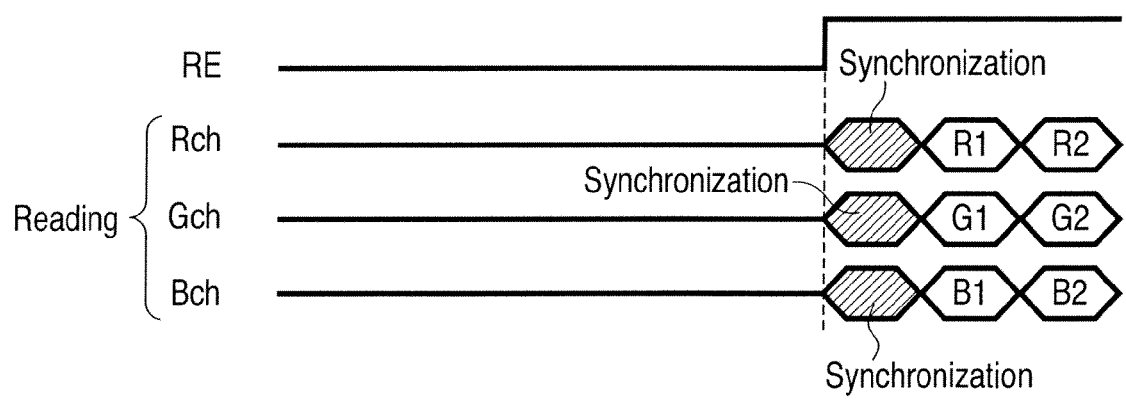
F I G. 3B

SIGNAL PROCESSING APPARATUS AND METHOD FOR SUPPRESSING A DELAY IN IMAGING DATA

CROSS-REFERENCE TO RELATED APPLICATIONS

This application is based upon and claims the benefit of priority from Japanese Patent Application No. 2009-296320, filed Dec. 25, 2009; the entire contents of which are incorporated herein by reference.

FIELD

Embodiments described herein relates generally to a head-separated type imaging apparatus and a signal processing method capable of suppressing the influence of a delay in imaging data in a head-(three-chip imaging section)-separated type camera device.

BACKGROUND

A camera device that uses a CONS (Complementary Metal-oxide Semiconductor) image sensor is widely spread. Nowadays, a camera device in which the head, that is, the imaging section can be separated, or a camera device in which the head is provided at a distance is widely put into practice. Japanese Patent Application Publication (KOKAI) No. 2005-311535 (KOKAI) discloses an imaging apparatus in which a detecting section of a control unit detects start data embedded in CCD data to set a timing to take in the CCD data.

BRIEF DESCRIPTION OF THE DRAWINGS

A general architecture that implements the various feature of the embodiments will now be described with reference to the drawings. The drawings and the associated descriptions are provided to illustrate the embodiments and not to limit the scope of the invention.

FIGS. 3A and 3B are exemplary diagrams each showing an example of an embodiment of the camera device according to an embodiment.

DETAILED DESCRIPTION

Various embodiments will be described hereinafter with reference to the accompanying drawings. In general, according to one embodiment, an imaging apparatus comprising: an imaging module that outputs imaging data for each color component including a synchronization code; a synchronization detecting module that detects a synchronization code from imaging data output from the imaging module; a data holding module that temporarily holds video data for each color component output from the imaging module; and a synchronization module that aligns the phases of video data for each color component held by the data holding module.

Embodiments will now be described hereinafter in detail with reference to the accompanying drawings.

Figure 1:
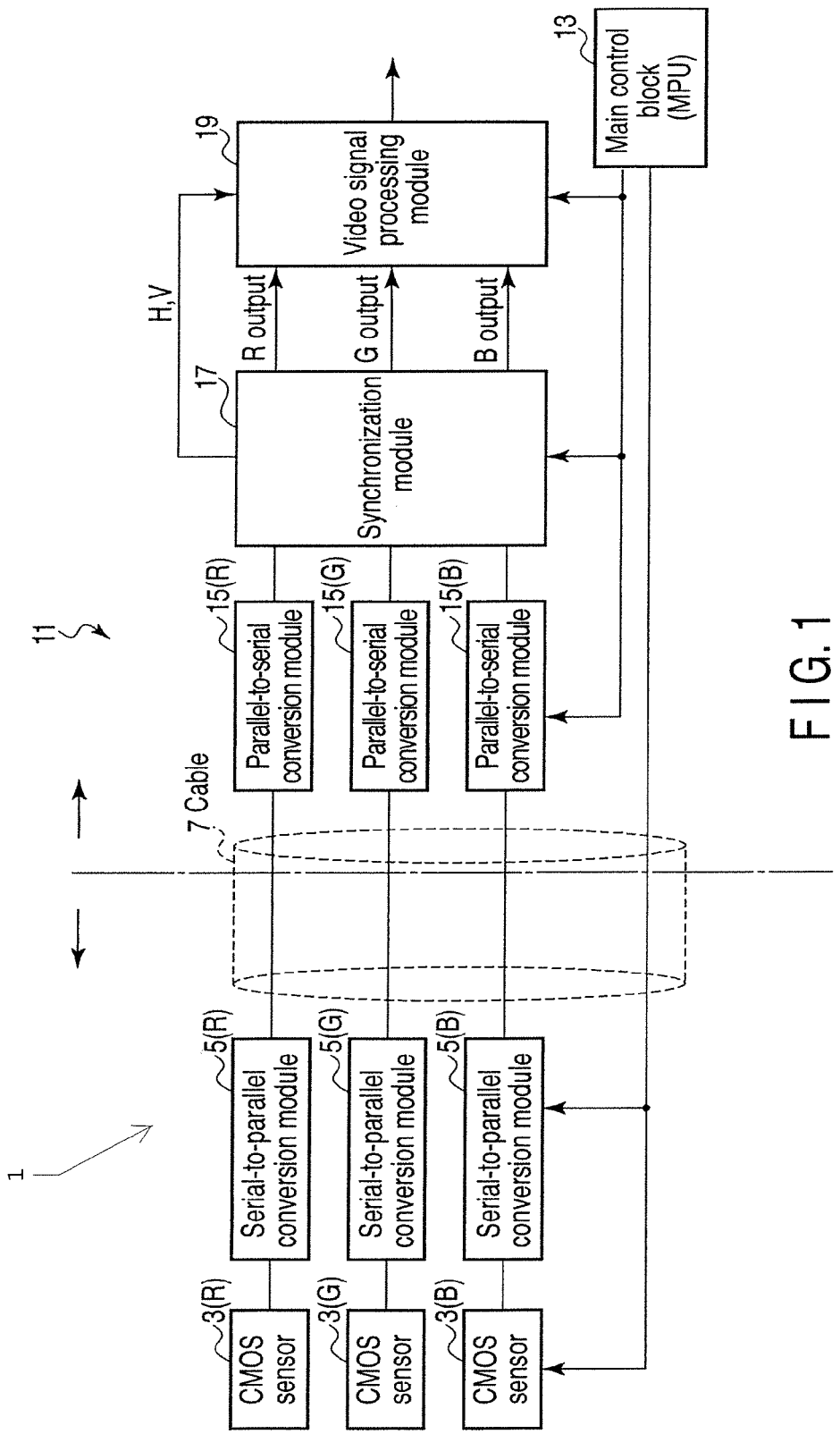
FIG. 1 is an exemplary diagram showing an example of a configuration of a three-chip head-separated type camera device according to an embodiment.

FIG. 1 shows a head-separated type imaging apparatus (camera device) to which an embodiment is applied. The component referred to as "module" below may be realized by hardware or by software in a CPU (microcomputer), etc.

A three-chip head-separated type imaging apparatus shown in FIG. 1 includes an imaging section (head), that is, an imaging module 1 and a control section (CCU), that is, a control module 11.

The imaging module 1 at least includes a CMOS (Complementary Metal-oxide Semiconductor) image sensor 3 and a serial-parallel conversion circuit (serializer) 5. The image sensor 3 and the serializer 5 are prepared independently for each of the three colors of additive color mixing, that is, R (red), G (green), and B (blue). In the explanation of the sensor or serializer for each color, if necessary, R, G, and B (suffix) are attached for distinction.

The control module 11 at least includes a main control block (MPU) 13, a parallel-serial conversion module (deserializer) 15, a synchronization module 17, and a video processing module (video processing circuit) 19. The deserializer 15 and the synchronization module 17 are prepared independently for each color in accordance with the individual image sensors. In the explanation of the deserializer or the synchronization module for each color, if necessary, R, G, and B (suffix) are attached for distinction.

In the head-separated type imaging apparatus shown in FIG. 1, imaging data captured by each of the CMOS sensors 3R, 3G, and 3B of the imaging module 1 according to an imaging start signal from the main control block (MPU) 13 on the side of the control module 11 is serial-converted by the serializers 5R, 5G, and 5B and input to the deserializers 15R, 15G, and 15B on the side of the control module 11 via a cable 7 for serial transmission. To the imaging data, that is, a video signal (Video), from each of the CMOS sensors, horizontal direction control data (HD) and vertical direction control data (VD) are attached.

The control module 11 absorbs (removes) a phase difference of a signal of each color component (ch [channel]) and a delay amount for a synchronization signal with the synchronization module 17 for each video signal (Video) returned to a parallel signal by each of the deserializers 15R, 15G, and 15B and outputs the signal to the video signal processing module 19 in the subsequent stage. The output of the video signal processing module 19 is supplied to a video reproducing apparatus, not shown schematically, or to a video output circuit, not shown schematically, etc.

Figure 2:
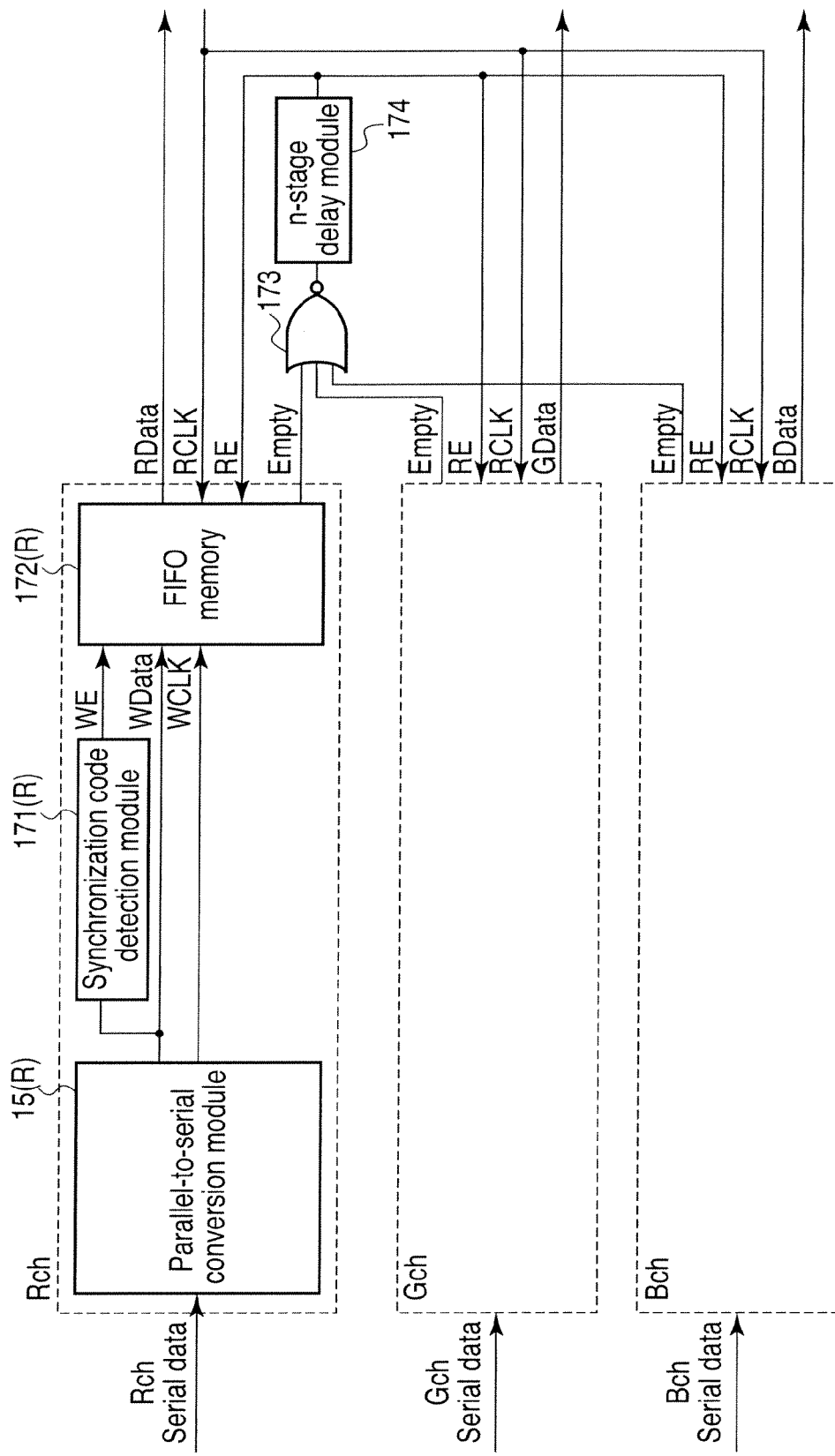
FIG. 2 is an exemplary diagram showing an example of an embodiment of the camera device according to an embodiment.

FIG. 2 explains the synchronization module in detail, which synchronizes the imaging data from each of the COMS sensor in the head-separated type imaging apparatus shown in FIG. 1. The processing of the video signal (Video) returned to a parallel signal by each of the deserializers 15R, 15G, and 15B is performed by substantially the same circuit module, and therefore, the output of the Rch (deserializer 15R) is explained here.

Video data (Video R) output from the CMOS sensor 3R and converted in parallel in the deserializer 15R is stored in an asynchronous FIFO memory (First-In First-Out memory) module 172 in accordance with a synchronization code detected by a synchronization code detecting module 171. That is, when a synchronization code embedded in advance in the video data (Video R) is detected, a WE (Write Enable) signal becomes valid and write to the FIFO 172 is started.

At the head of the video data to be supplied to the FIFO 172, a synchronization code is written without exception. As a write clock, WCLK sent from the deserializer 15R is used.

The FIFO 172 includes an Empty signal that indicates whether or not there is stored data, that is, whether or not the FIFO 172 is empty and when there is no data (in the FIFO 172), the signal turns on.

A NOR gate 173 detects that all (any of) the Empty signals of each channel are (is) not on (that is, there is data in the FIFO 172) using the Empty signal and validates an RE (Read Enable) signal. An n-stage delay circuit (n is a positive integer) 174 generates a certain amount of delay in write and read by validating RE after several clocks later to prevent read from taking place before write (to prevent read from the FIFO 172 from starting before video data is stored in each FIFO 172).

A read clock (RCLK) is a clock generated on the side of the CCU 11 and asynchronous with the write clock (WCLK).

RE and RCLK are common to all the channels, and therefore, read from the FIFO 172 is performed at the same time in each channel. That is, the timing at which data is read from the FIFO 172 is the same regardless of the channel (color component).

Because of this, by detecting the synchronization signal attached to the head of the video data without exception to be supplied to the FIFO 172 of each channel, it is possible to absorb the shifts in phase and synchronization of the clock by temporarily holding the data of each channel using the FIFO 172 and simultaneously reading the data at a predetermined timing.

That is, as is obvious from FIG. 3A showing a write timing to the FIFO 172 and FIG. 3B showing a read timing also from the FIFO 172, when the number of delayed clocks of the n-stage delay circuit 173 is illustrated as one clock, it is possible to simultaneously read the video data of each of R, G, and B even when there is a shift in phase between each channel of R, G, and B by reading the video data while regarding RE as valid at a time when the FIFO 172 in all the channels is not empty (when data is stored in the FIFO 172 of any of the channels). In consequence, as shown in FIG. 3B, it is possible to align the phases of the video data of all the channels. The example shown in FIG. 3B shows an example in which the video data is read one clock after a time when the video data of all the channels is stored in the FIFO 172. It is also possible to read video data while regarding RE (Read Enable) as valid a predetermined period of time after a time when the video data is written to any of the FIFOs 172 for the first time, that is, by preserving a sufficient period of time in which video data of each color is written to all the FIFOs 172.

Figure 4:
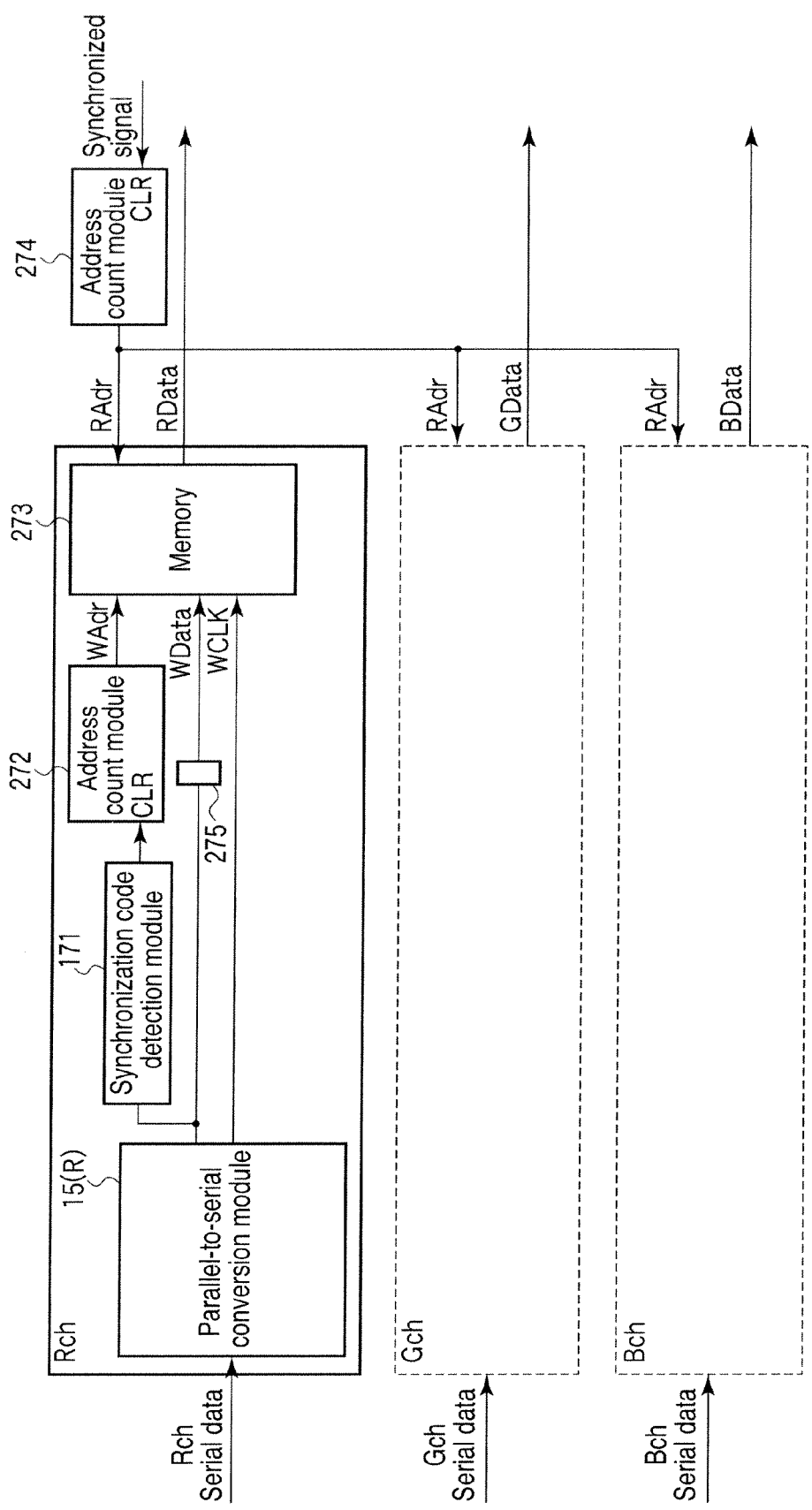
FIG. 4 is an exemplary diagram showing an example of another embodiment of the camera device according to an embodiment.

FIG. 4 shows another embodiment of the synchronization module shown in FIG. 2.

Video data (Video R) converted in parallel in a deserializer 15R and output from a CMOS sensor 3R is stored in a (general type) memory module 273, which is usually used, in accordance with a synchronization code detected by a synchronization code detecting module 171.

It is to be noted that, by providing a write address counter module 272 in the previous stage of the memory module 273 and clearing the counter of the write address counter module 272 using the synchronization code detected by the synchronization code detecting module 171, the synchronization code is written without fail in the head address of a region in which video data to be stored in the memory module 273 is stored. That is, by providing a delay module 275 in the previous stage of the memory module 273, it is possible to match the timing of the video data with a time required for the synchronization code detection by the synchronization code detecting module 171, the clearing of the counter of the write address counter module 272 using the detected synchronization code, and the generation of an address to store the video data to be memorized in the memory module 273.

On the other hand, the read address is determined by an address counter module 274 that is cleared with a synchronization signal generated on the side of a CCU 11 (MPU 13).

Accordingly, the video data of each color held by the memory module 273 is supplied at a time (all the colors at the same time) to a video signal processing module 19 in the subsequent stage with a counter value specified by the address counter module 274. In consequence, it is possible to align the phases of the video data of all the channels.

The synchronization module shown in FIG. 4 does not detect the completion of the storing of all the video data of each channel to be held by the memory module 273, and therefore, the timing at which the video data of each channel is read from the memory module 273 is delayed as much as a time required for the video data to be stored in all of the channels of the memory module 273, for example, several clocks. Further, the video data of each channel to be supplied to the memory module 273 is delayed as much as predetermined clocks for each channel by the delay module 275. In this case, the timing at which the synchronization code (video data) is supplied and the shift in time of the data of each channel need to be known in advance to a certain level, but when a synchronization signal that has taken the time into consideration is generated in the CCU 11, the phases of the video data of all the channels can be aligned as described above.

In a case where the deserializer is constituted of a PLD (Programmable Logic Device), it is possible to embody the present proposal without any need to considerably change the current system by adding an FIFO or memory to the inside of the PLD. Therefore, it is unlikely that, for example, the cost is considerably increased.

As explained above, according to an embodiment, the video data having no shift in synchronization can be obtained without any need to considerably change the current system.

Further, it is possible to easily realize a head-separated type imaging apparatus capable of suppressing the influence of jitter or skew resulting from a delay in the imaging data from a three-chip head (imaging section).

Furthermore, it is possible to establish a signal processing method capable of suppressing the influence of jitter or skew resulting from a delay in the imaging data from the three-chip head (imaging part).

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An imaging apparatus comprising:
   an imaging module configured to output imaging data for each color component of a plurality of color components, where each color component includes a synchronization code;
   a synchronization detecting module configured to detect the synchronization code from the imaging data for each color component output from the imaging module;
   a data holding module configured to temporarily hold the imaging data for each color component output from the imaging module in accordance with the synchronization code detected by the synchronization detecting module; and a synchronization module configured to output the imaging data for each color component temporarily held by the data holding module after applying a delay for one or more color components of the plurality of color components and aligning the imaging data for each color component based on the delay and the synchronization code.

2. The imaging apparatus of claim 1, wherein the data holding module includes an asynchronous first-in first-out (FIFO) memory.

3. The imaging apparatus of claim 2, wherein the synchronization module is configured to output the imaging data for each color component concurrently after a predetermined time has elapsed from a point of time when the imaging data for at least one color component of the plurality of color components is held in the data holding module.

4. The imaging apparatus of claim 2, wherein:
the data holding module is a memory module; and
the synchronization module includes a first address counter configured to count an address of imaging data stored in the memory module and to clear an address count value of the imaging data stored in the memory module, and a second address counter configured to output an address count value for reading the imaging data from the memory module.

5. A controller of an imaging device of apart from an imaging head comprising:
a detecting module configured to detect a synchronization code from imaging data of each color component of a plurality of color components;
a data holding module configured to temporarily hold the imaging data of each color component in accordance with the synchronization code; and
a synchronization module configured to output the imaging data for each color component temporarily held by the data holding module after applying a delay for one or more color components of the plurality of color components and to align phases of the imaging data for each color component held by the data holding module based on the delay and the synchronization code.

6. The controller of claim 5, wherein the data holding module includes an asynchronous first-in first-out (FIFO) memory.

7. The controller of claim 5, wherein the synchronization module is configured to output the imaging data for each color component concurrently after a predetermined time has elapsed from a point of time when the imaging data for at least one color component of the plurality of color components is held in the data holding module.

8. The controller of claim 5, wherein the data holding module is a memory module; and
the synchronization module includes a first address counter configured to count an address of imaging data stored in the memory module and to clear an address count value of the imaging data stored in the memory module, and a second address counter configured to output an address count value for reading the imaging data from the memory module.

9. A signal processing method for an imaging apparatus comprising:
detecting a synchronization code from imaging data for each color component of a plurality of color components, each color component including a synchronization code;
temporarily holding imaging data for each color component by a data holding module, in accordance with the synchronization code; and
outputting the imaging data for each color component temporarily held by the data holding module after applying a delay for one or more color components of the plurality of color components and aligning phases of the imaging data for each color component held by the data holding module based on the delay and the synchronization code.

10. The signal processing method of claim 9, wherein the temporarily holding of the imaging data is conducted by an asynchronous first-in first-out (FIFO) memory.

11. The signal processing method of claim 9, wherein the imaging data for each color component is output concurrently after a predetermined time has elapsed from a point in time when the imaging data for at least one color component of the plurality of color components is held in the data holding module.

* * * * *